(12) United States Patent
Motomura et al.

(10) Patent No.: US 8,304,742 B2
(45) Date of Patent: Nov. 6, 2012

(54) RADIATION DETECTOR USING GAS AMPLIFICATION AND METHOD FOR MANUFACTURING THE SAME

(75) Inventors: Tomohisa Motomura, Tokyo (JP); Osamu Shimada, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/480,504

(22) Filed: May 25, 2012

(65) Prior Publication Data
US 2012/0227260 A1  Sep. 13, 2012

Related U.S. Application Data

(62) Division of application No. 12/489,235, filed on Jun. 22, 2009, now Pat. No. 8,207,505.

(30) Foreign Application Priority Data

Jun. 23, 2008  (JP) ............................... P2008-163205
Jun. 9, 2009  (JP) ............................... P2009-138019

(51) Int. Cl.
*H01L 21/00* (2006.01)
*G01T 1/24* (2006.01)

(52) U.S. Cl. ........................................ 250/385.1; 438/57
(58) Field of Classification Search ............. 250/370.01, 250/370.08, 370.09, 385.1; 438/48, 57
See application file for complete search history.

(56) References Cited

U.S. PATENT DOCUMENTS
6,822,239 B2  11/2004  Tanimori et al.

FOREIGN PATENT DOCUMENTS
EP  1 219 975 B1  10/2005
JP  2002-006047  1/2002

*Primary Examiner* — Mark R Gaworecki
(74) *Attorney, Agent, or Firm* — Finnegan, Henderson, Farabow, Garrett & Dunner, L.L.P.

(57) ABSTRACT

A radiation detector using gas amplification includes: a first electrode pattern which is formed on a first surface of an insulating member and has a plurality of circular openings; and a second electrode pattern which is formed on a second surface of the insulating member opposite to the first surface thereof and has convex portions of which respective forefronts are exposed to centers of the openings of the first electrode pattern; wherein a predetermined electric potential is set between the first electrode pattern and the second electrode pattern; wherein edges of the first electrode pattern exposing to the openings are shaped in respective continuous first curved surfaces by covering the edges thereof with a first solder material.

6 Claims, 4 Drawing Sheets

RADIATION DETECTOR USING GAS AMPLIFICATION AND METHOD FOR MANUFACTURING THE SAME

This is a division of application Ser. No. 12/489,235, filed Jun. 22, 2009 now U.S. Pat. No. 8,207,505, which is incorporated herein by reference.

CROSS-REFERENCE TO RELATED APPLICATIONS

This application is based upon and claims the benefit of priorities from the prior Japanese Patent Application No. 2008-163205 filed on Jun. 23, 2008 and Japanese Patent Application No. 2009-138019 filed on Jun. 9, 2009; the entire contents which are incorporated herein by reference.

BACKGROUND

1. Field of the Invention

The present invention relates to a radiation detector with a pixel electrode using gas amplification and a method for manufacturing the radiation detector.

2. Background of the Invention

Conventionally, a pixel radiation detector would be employed as a radiation detector using gas amplification. In the conventional pixel radiation detector, a strip cathode electrode is formed on the main surface of a double-sided printed substrate and a strip anode electrode is formed on the rear surface of the same printed substrate while openings are formed in the strip cathode electrode at a constant pitch and columnar anode electrodes are protruded at the centers of the respective openings, the columnar electrodes being electrically connected with the strip anode electrode. In this case, the columnar electrodes constitute the pixel electrode of the pixel radiation detector.

Here, the radiation detector is disposed in an atmosphere containing He gas and methane gas. Then, a voltage of 600 V is applied between the pixel electrode and the strip cathode electrode, for example.

In the radiation detector, when a given radiation is input into the detector, the gas is ionized to generate electrons. Since a large voltage is applied between the strip cathode electrode and the pixel electrode such that an electric field with a high intensity is generated due to the configuration of point electrode of the pixel electrode (i.e., the shape anisotropy of the pixel electrode), electron avalanche amplification is brought about. On the other hand, the positive ions generated by the electron avalanche amplification are drifted to the corresponding approximate edges of the strip cathode electrode from the pixel electrode (i.e., the columnar electrodes).

As a result, the holes and electrons are charged to the corresponding strip cathode electrode and pixel electrode (columnar electrodes). Therefore, when the charging positions of the strip cathode electrode and the pixel electrode (i.e., columnar electrodes) are detected, the input position of the radiation in the detector can be specified and thus, the radiation can be detected (Reference 1).

[Reference 1] JP-A 2002-006047

In the radiation detector, as the voltage to be applied to the pixel electrode is increased, the intensity of the electric field to be generated is increased so that the electron avalanche amplification is brought about remarkably. In this case, since the amounts of charge at the strip cathode electrode and the pixel electrode (i.e., columnar electrodes) are increased, the detection sensitivity of the radiation can be also increased. On the other hand, if a large voltage is applied to the pixel electrode, particularly, arc discharge occurs between the pixel electrode and the edges exposing to the corresponding openings of the strip cathode electrode so as to damage the strip cathode electrode and the pixel electrode.

In this way, even though the voltage to be applied to the pixel electrode is increased in order to enhance the detection sensitivity of the radiation detector, the arc discharge occurs so that the radiation detector can not be functioned than the detection sensitivity of the radiation detector is enhanced.

In contrast, when the voltage to be applied to the pixel electrode is decreased, the arc discharge is unlikely to occur while the electron avalanche amplification is reduced so that the detection sensitivity of the radiation detector for the radiation is decreased.

In this point of view, such an attempt is made as narrowing the pixel electrode (i.e., the columnar electrodes) and enhancing the intensity of the electric field to be generated instead of controlling the voltage to be applied to the pixel electrode. However, since the pixel electrode is configured such that the through holes formed in the printed substrate are embedded by means of via-fill plating, it is required to narrow the through holes in order to narrow the pixel electrode.

In contrast, when the through holes are narrowed, the via-fill plating can not be uniformly carried out for the through holes so that the pixel electrode can not be also formed uniformly. In this case, anomalous discharge and dielectric breakdown disadvantageously occur. Therefore, the narrowing of the pixel electrode is restricted spontaneously in dependence on the forming method.

As a result, as of now, the voltage to be applied to the pixel electrode can not be sufficiently developed while the narrowing of the pixel electrode can not be sufficiently realized, so that the detection sensitivity of the pixel radiation detector can not be sufficiently enhanced.

BRIEF SUMMARY OF THE INVENTION

It is an object to provide a new pixel radiation detector which has a sufficiently higher detection sensitivity and a method for manufacturing the new pixel radiation detector.

In order to achieve the above object, the present invention relates to a radiation detector using gas amplification, including: a first electrode pattern which is formed on a first surface of an insulating member and has a plurality of circular openings; and a second electrode pattern which is formed on a second surface of the insulating member opposite to the first surface thereof and has convex portions of which respective forefronts are exposed to centers of the openings of the first electrode pattern; wherein a predetermined electric potential is set between the first electrode pattern and the second electrode pattern; wherein edges of the first electrode pattern exposing to the openings are shaped in respective continuous first curved surfaces by covering the edges thereof with a first solder material.

The present invention also relates to a method for manufacturing a radiation detector using gas amplification, comprising the steps of: forming a first electrode layer on a first surface of an insulating member and forming a second electrode layer on a second surface of the insulating member opposite to the second surface thereof; conducting a first treatment including resist coating, exposing, developing and etching for the first electrode layer to form a plurality of openings for processing at the first electrode layer; irradiating an energy beam onto the insulating member via the plurality of openings for processing formed at the first electrode layer or conducting a second treatment including resist coating, exposing and developing when the insulating member is a photosensitive insulating member to form through holes at the insulating member in a thickness direction of the insulating member; conducting via-fill plating into the through holes to form metallic plating layers so as to embed the through holes; conducting the first treatment for the first electrode layer to form a plurality of circular openings such that the metallic plating members are disposed at centers of the circular openings, respectively, and to form a first electrode pattern while forming a second electrode pattern made of convex portions of the metallic plating layers and the second electrode layer; and forming and ref lowing a first solder material on the first electrode pattern such that edges of the first electrode pattern exposing to the openings are shaped in respective continuous first curved surfaces by covering the edges thereof with the first solder material.

The inventors studied intensely so as to achieve the object of the present invention. As a result, the inventors found out the following fact of the matter. In a conventional radiation detector, if a voltage of e.g., 500 V to 700 V is applied between the pixel electrode made of the convex portions of the second electrode pattern and the strip cathode electrode made of the first electrode pattern, the thus generated electric field is concentrated onto the rectangular edges of the strip cathode electrode which is exposed to the corresponding openings so that arc discharge occurs between the pixel electrode and the strip cathode electrode.

In the present invention, therefore, the first solder material is formed on the first electrode pattern constituting the strip cathode electrode and ref lowed so as to cover the edges exposing to the corresponding openings of the first electrode pattern and thus, shape the edges thereof in respective continuous first curved surfaces. Therefore, if a large voltage is applied between the first electrode pattern and the convex portions of the second electrode pattern, that is, between the pixel electrode and the strip cathode electrode, the thus generated electric field can not be locally concentrated because the edges of the first electrode pattern are shaped so as to have the respective curved surfaces.

As a result, if a large voltage is applied between the edges of the first electrode pattern and the convex portions of the second electrode pattern, that is, between the pixel electrode and the strip cathode electrode, the occurrence of arc discharge therebetween can be prevented. Therefore, the radiation detector can exhibit a high detection sensitivity due to the application of the large voltage therebetween.

In an aspect of the present invention, a second solder material is formed and ref lowed on the convex portions of the second electrode such that the convex portions of the second electrode pattern are shaped in respective continuous second curved surfaces by covering the convex portions with the second solder material. As described above, when a large voltage is applied between the pixel electrode made of the convex portions of the second electrode pattern and the strip cathode electrode made of the first electrode pattern, the arc discharge firstly occurs by the electric concentration of the electric field originated from the large voltage onto the edges of the strip cathode electrode.

However, in the case where the surface state of the pixel electrode is nonuniform because some protrusions are formed on the pixel electrode, the electric field is likely to be concentrated onto the protrusions of the pixel electrode so that arc discharge is likely to occur between the protrusions of the pixel electrode and the edges of the strip cathode electrodes.

According to the aspect of the present invention, therefore, the surface state of the pixel electrode (i.e., the protrusions thereof) can be shaped in a continuous curved surface by covering the convex portions of the second electrode pattern with a solder material so that the local electric concentration of the electric field for the pixel electrode can be prevented. As a result, the radiation detector can exhibit a high detection sensitivity due to the high voltage to be applied.

In the present invention, the wordings "continuous first curved surface" and "continuous second curved surface" mean that the surface state is smooth without local deformation such as protrusion and depressed portion from the starting point of the surface to the ending point thereof.

Moreover, since the edges of the first electrode pattern as the strip cathode electrode are shaped in curved surfaces respectively and/or the convex portions of the second electrode pattern as the pixel electrode are shaped in hemispherical surfaces respectively, the curved surfaces being curved outward from the corresponding edges of the first electrode pattern and the hemispherical surfaces being curved outward, the curvatures of the curved surfaces and the hemispherical surfaces become large, so that the electric concentration for the edges of the first electrode pattern and/or the convex portions of the second electrode pattern can be prevented, thereby suppressing the arc discharge at the edges thereof and/or the convex portions thereof effectively and efficiently. As a result, the radiation detector can absolutely exhibit a high detection sensitivity dependent on the amplitude of the voltage to be applied.

In the case where the surface state of the pixel electrode is nonuniform such that some protrusions and the like are formed on the surface of the pixel electrode, as described above, the electric concentration of the electric field on the protrusions and the like can be suppressed by covering the convex portions of the second electrode pattern as the pixel electrode with a solder material even though the edges of the first electrode pattern are not covered with a solder material, so that the arc discharge between the convex portions of the second electrode pattern as the pixel electrode and the edges of the first electrode pattern as the strip cathode electrode can be suppressed.

As described above, according to the present invention can be provided a new pixel radiation detector which has a sufficiently higher detection sensitivity and a method for manufacturing the new pixel radiation detector.

BEST MODE FOR IMPLEMENTING THE INVENTION

Hereinafter, the present invention will be described in detail with reference to the drawings.

Figure 1:
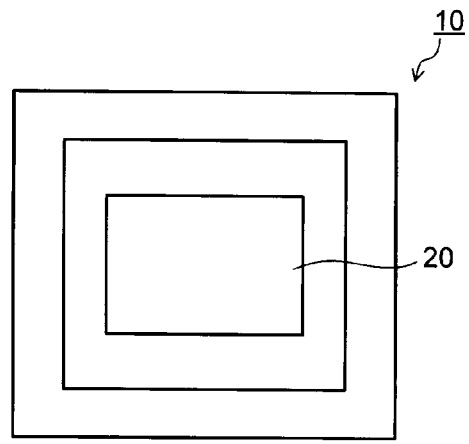
FIG. 1 is a plan view schematically showing the structure of the radiation detector according to an embodiment of the present invention.
Figure 2:
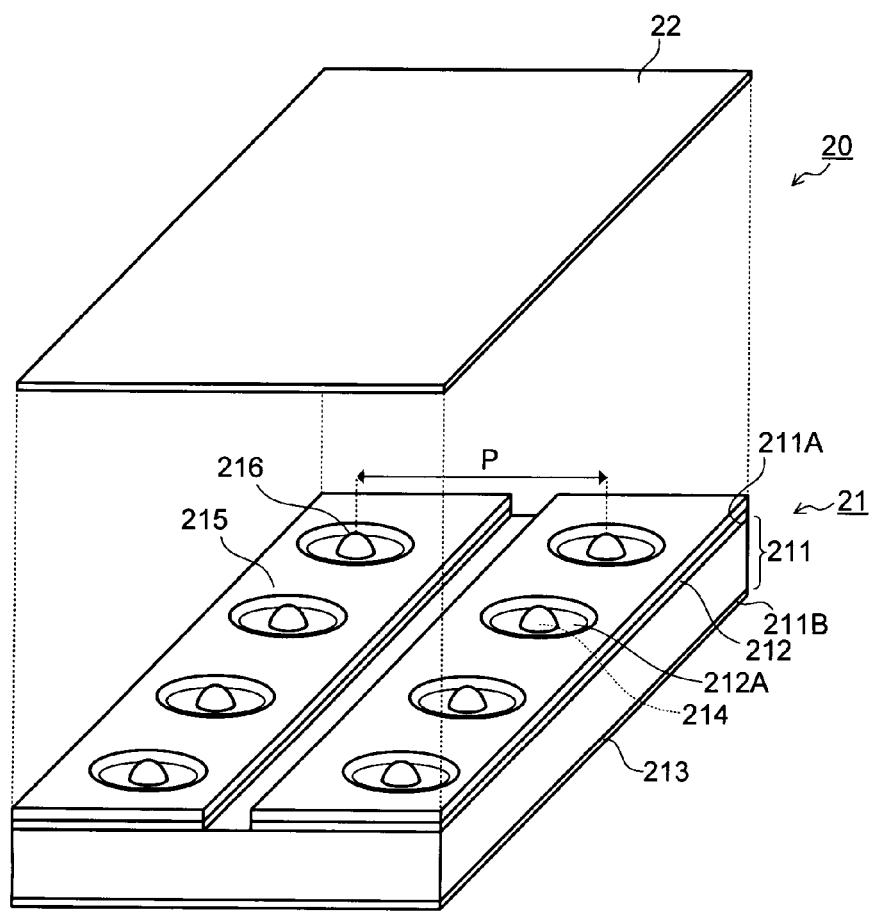
FIG. 2 is a perspective view enlargedly showing the pixel radiation detector of the radiation detector shown in FIG. 1.
Figure 3:
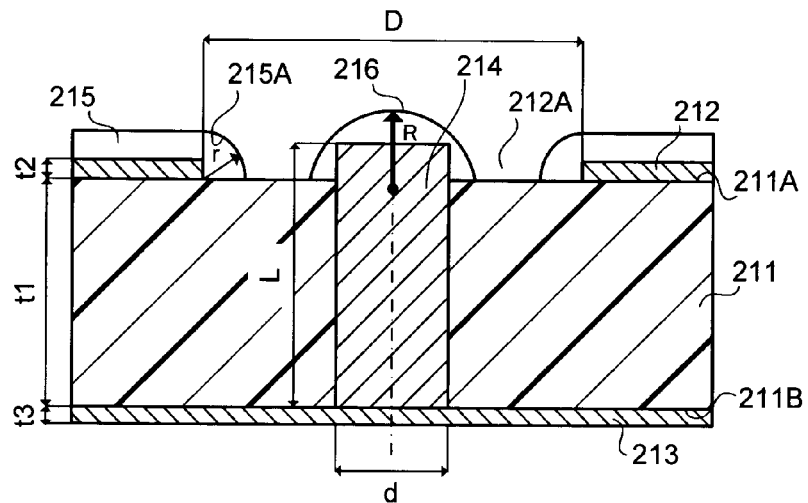
FIG. 3 is a cross sectional view enlargedly showing the area around the pixel electrode of the pixel radiation detector.

FIG. 1 is a plan view schematically showing the structure of the radiation detector according to an embodiment of the present invention. FIG. 2 is a perspective view enlargedly showing the pixel radiation detector of the radiation detector shown in FIG. 1. FIG. 3 is a cross sectional view enlargedly showing the area around the pixel electrode of the pixel radiation detector.

As shown in FIG. 1, a radiation detector 10 in this embodiment includes a pixel radiation detector 20 and a current detecting circuit (not shown). As shown in FIG. 2, the pixel radiation detector 20 includes a detecting panel 21 and an electrode plate 22 which is provided above the detecting panel 21 so as to be opposite thereto.

As shown in FIG. 2, the detecting panel 21 includes a first electrode pattern 212 with a plurality of circular openings 212A which is formed on the main surface 211A of an insulating member 211 and a second electrode pattern 213 formed on the rear surface 211B of the insulating member 211. The second electrode pattern 213 includes convex portions 214 which are formed through the insulating member 211 and of which the forefronts are exposed almost at the centers of the openings 212A of the first electrode pattern 212, respectively. Here, the convex portions 214 constitute a pixel electrode.

Moreover, a first solder material 215 is formed on the first electrode pattern 212 and melted through the reflow thereof so that the edges of the first solder material 215 exposing to the corresponding openings 212A can be shaped in respective curved surfaces, the curved surfaces being curved outward from the edges of the first electrode pattern 212 exposing to the corresponding openings 212A. Moreover, a second solder material is formed over the convex portions 214 of the second electrode pattern 213 and melted through the reflow thereof so that the top surfaces of the convex portions can be shaped in respective hemispherical surfaces, the hemispherical surfaces being curved outward.

The curvature of the first solder material 215 at each edge 215A is preferably set so as to satisfy the relation of $0.3 \leq r/t2 \leq 1.25$ if the curvature radius of the curvature of the first solder material 215 at each edge 215A is defined as "r" and the thickness of the first electrode pattern 212 is defined as "t2". The curvature of the second solder material 216 is preferably set so as to satisfy the relation of $0.07 \leq R/d \leq 0.25$ if the curvature radius of the curvature of the second solder material 216 is defined as "R" and the diameter of each of the convex portions 214 is defined as "d".

If the above relations are satisfied, the first solder material 215 at each edge 215A and the second solder material 216 at each convex portion 214 are shaped so as to have the respective loose curved (spherical) surfaces, so that arc discharge due to the electric field concentration can be effectively suppressed, as will described below.

For simplification, in the detecting panel 21 of the pixel radiation detector 20 shown in FIG. 2, eight openings 212A are formed at the first electrode pattern 211A in double row such that four openings 212A are arranged per row and in parallel. Moreover, the forefronts of the convex portions 214 are protruded from the corresponding openings 212A (the insulating portions located between the edges of the first electrode pattern (strip cathode electrode) exposing to the corresponding openings 212A and the pixel electrode (convex portions) such that eight detecting electrode can be formed. However, the number of the detecting electrode and the arrangement (the number and arrangement of the openings 212A of the first electrode pattern 212 and the convex portions 214 of the second electron pattern 213) may be determined as occasion demands.

Not particularly shown, the second electrode pattern 213 are also patterned in strip so as to be almost orthogonal to the arrangement direction of the first electrode pattern 212. Here, the second electrode pattern 213 may be patterned in any direction not parallel to the arrangement direction of the first electrode pattern 212.

The thickness "t1" of the insulating member 211 may be set within a range of 20 μm to 100 μm, for example. The thickness "t2" of the first electrode pattern 212 and the thickness "t3" of the second electrode pattern 213 may be set within a range of 5 μm to 18 μm, respectively. The height "L" of the convex portion 214 may be set to the summation of the thickness "t1" of the insulating member 211 and the thickness "t2" of the first electrode pattern 212. The diameter "D" of the opening 212A may be set within a range of 80 μm to 300 μm. The diameter "d" of the convex portion 214 may be set within a range of 15 μM to 70 μm.

In this case, the curvature radius "r" of the first solder material 215 may be set within a range of 5 μm to 30 μm, and the curvature radius "R" of the second solder material 216 may be set within a range of 5 μm to 30 μm.

The first electrode pattern 212 and the second electrode pattern 213 may be made of an electrically conductive material such as copper, gold, silver, nickel and aluminum. The insulating member 211 may be made of a thermosetting resin film or sheet.

The first solder material 215 and the second solder material 216 may be made of a high-temperature Pb-free solder material such as a Sn—Cu or Sn—Ag—Cu based Pb-free solder material, a medium-temperature Pb-free solder material such as a Sn—Zn based Pb-free solder material or a Sn—Bi based Pb-free solder material in addition to a normal Pb—Sn based solder material.

The first solder material 215 may be made of the same solder material as the second solder material 216. Alternatively, the first solder material 215 may be made of a different solder material from the second solder material 216. In the latter case, however, since the number of step for forming the solder materials is increased in the total manufacturing process for the intended radiation detector 10, the total number of step for manufacturing the radiation detector 10 is also increased. In this point view, the former case (the first solder material 215 is made of the same solder material as the second solder material 216) is preferable.

A predetermined voltage, e.g., within a range of 500 V to 700 V is applied between the first electrode pattern 212 and the second electrode pattern 213. In this case, the first electrode pattern 212 may be set as a cathode electrode and the second electrode pattern 213 may be set as an anode electrode. Alternatively, the first electrode pattern 212 may be set as an anode electrode and the second electrode pattern 213 may be set as a cathode electrode.

In order to bring about the electron avalanche amplification as will described below, since the shapes, constituting the point electrodes, of the convex portions 214 of the second electrode pattern 213 are very important, it is desired that the first electrode pattern 212 is set as a cathode electrode and the second electrode pattern 213 is set as an anode electrode. Therefore, the preferable example will be described hereinafter.

A predetermined gas, e.g., a mixed gas of He gas and methane gas is charged between the detecting panel 21 and the electrode plate 22. The electrode plate 22 is biased to a predetermined electric potential.

When a radiation is input into the radiation detector 10 shown in FIG. 1, the radiation collides with the atoms or molecules of the charged gas so that the charged gas (i.e., the atoms or molecules) is ionized to generate electrons. The thus generated electrons are introduced to the detecting panel 21 subject to the electric potential of the electrode plate 22 of the pixel radiation detector 20 so as to bring about the electron avalanche also subject to the high intensity electric field generated between the first electrode pattern 212 and the convex portions 214 of the second electrode pattern 213, the high intensity electric field being generated by the large voltage applied between the first electrode pattern 212 and the convex portions 214 of the second electrode pattern 213. As the result of the electron avalanche, the newly generated electrons are charged to the convex portions 214. On the other hand, the positive ions generated by the electron avalanche are drifted from the convex portions 214 to the corresponding edges of the first electrode pattern 212 in the vicinity of the convex portions 214.

Accordingly, since the holes and electrons are charged to the first electrode pattern 212 and the convex portions 214 of the second electrode pattern 213, respectively, the input position of the radiation in the pixel radiation detector 20 can be specified by detecting the position of the charged convex portions 214, that is, the charged position of the pixel electrode with the electric charge detecting circuit (not shown). In this way, the input radiation can be detected.

On the other hand, since the edges of the first electrode pattern 212 are covered with the first solder material 215 so as to have the respective curved surfaces (spherical surfaces), the electric field can not be locally concentrated to the edges of the first electrode pattern 212. As a result, even though the large voltage is applied between the first electrode pattern 212 and the convex portions 214 of the second electrode pattern 213, that is, between the strip cathode electrode and the pixel electrode, no arc discharge can occur therebetween. Therefore, the radiation detector 20 can exhibit a high detecting sensitivity due to the application of the large voltage.

Moreover, since the convex portions 214 of the second electrode pattern 213 are covered with the second solder material 216 so as to have the respective curved surfaces (spherical surfaces), the surface nonuniformity due to some protrusion formed on the surface of the second electrode pattern 213 can be diminished by the second solder material 216 even though the surface state of the second electrode pattern 213 becomes nonuniform due to the formation of the protrusions. Therefore, the arc discharge originated from the surface nonuniformity of the convex portions 214 of the second electrode pattern 213 can be prevented so that the radiation detector 20 can exhibit a high detecting sensitivity due to the application of the large voltage.

Here, since the surface nonuniformity of the convex portions 214 of the second electrode pattern 213 is originated from the defects generated through the manufacturing process thereof, the surface nonuniformity can not be formed if the convex portions 214 of the second electrode pattern 213 are formed ideally. In this case, therefore, no arc discharge due to the surface nonuniformity occurs.

On the other hand, the edges of the first electrode pattern 212 (located at the insulating portions between the strip cathode electrode and the pixel electrode) become rectangular as the first electrode pattern 212 is formed ideally so that arc discharge is likely to occur by the electric concentration of the electric field onto the edges thereof. Therefore, the edges of the first electrode pattern 212 firstly contribute to the occurrence of the arc discharge and the surface uniformity of the convex portions 214 of the second electrode pattern 213 secondly contribute the occurrence of the arc discharge.

In this point of view, in the operation of the radiation detector 20 at high detecting sensitivity, to diminish the edges of the first electrode pattern 212 with the first solder material 215 is firstly important and to diminish the surface nonuniformity of the convex portions 214 of the second electrode pattern 213 with the second solder material is secondly important.

Then, the manufacturing method of the radiation detector of an embodiment of the present invention will be described. FIGS. 4 to 10 relate to the steps of the manufacturing method. FIGS. 4 to 10 are cross sectional views relating to the pixel radiation detector under manufacture, taken on line P-P.

Figure 4:
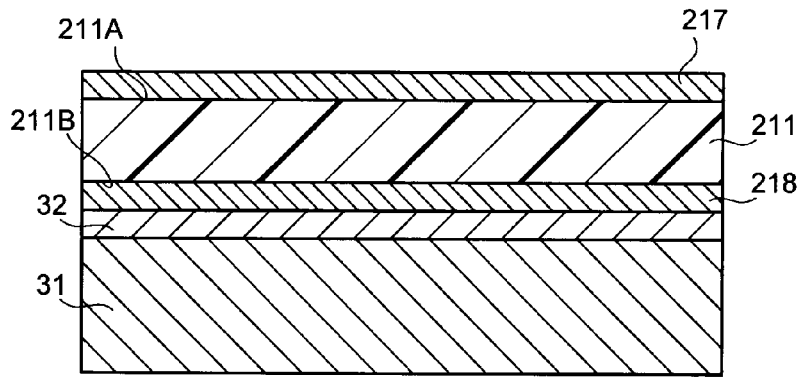
FIG. 4 is a cross sectional view showing one step of the manufacturing method according to an embodiment of the present invention.

First of all, as shown in FIG. 4, a first electrode layer 217 and a second electrode layer 218 are formed on the main surface 211A and the rear surface 211B of the insulating member 211. The insulating member 211 may be made of a thermosetting resin film or sheet, for example. The first electrode layer 217 and the second electrode layer 218 are made of an electrically conductive material such as copper. Then, the second electrode layer 218 is adhered with a supporting substrate 31 made of, e.g., polyimide via a prepreg 32.

In the case where the insulating member 211 is thick enough to have a large mechanical strength capable of bearing the subsequent manufacturing steps as will described below, the supporting substrate 31 and the prepreg 32 may be omitted.

Figure 5:
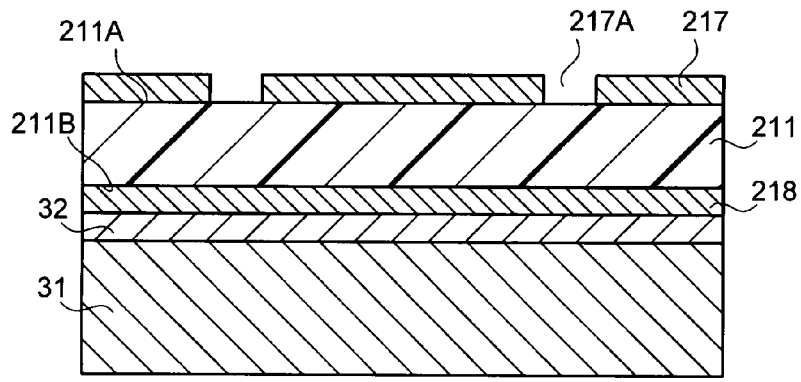
FIG. 5 is also a cross sectional view showing one step of the manufacturing method according to an embodiment of the present invention.

As shown in FIG. 5, then, a first treatment including a set of subsequent resist coating, exposing, developing and etching is carried out for the first electrode layer 217 so that a plurality of openings 217A for processing are formed and simultaneously, the first electrode layer 217 is formed in strip shape.

Figure 6:
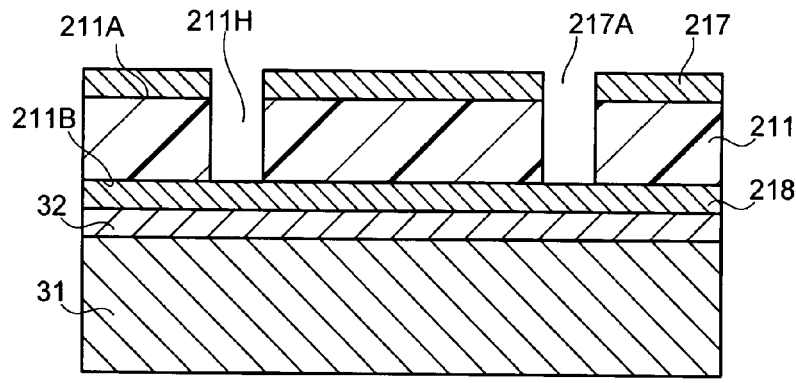
FIG. 6 is also a cross sectional view showing one step of the manufacturing method according to an embodiment of the present invention.

As shown in FIG. 6, an energy beam is irradiated onto the insulating member 211 via the openings 217A for processing of the first electrode layer 217 to form through holes 211H in the thickness direction of the insulating member 211. As the energy beam, a laser beam may be employed, for example. In this case, it is preferable to use a carbon dioxide gas laser. The carbon dioxide gas laser processes only the insulating member 211 and does not process the second electrode layer 218 due to the wavelength characteristics. In the case where the insulating member 211 is a positive photosensitive material, a second treatment including a set of subsequent resist coating, exposing, and developing is carried out for the insulating member 211. In this case, the exposed portions of the insulating member 211 are melted and removed by the developing to form the through holes 211H.

Figure 7:
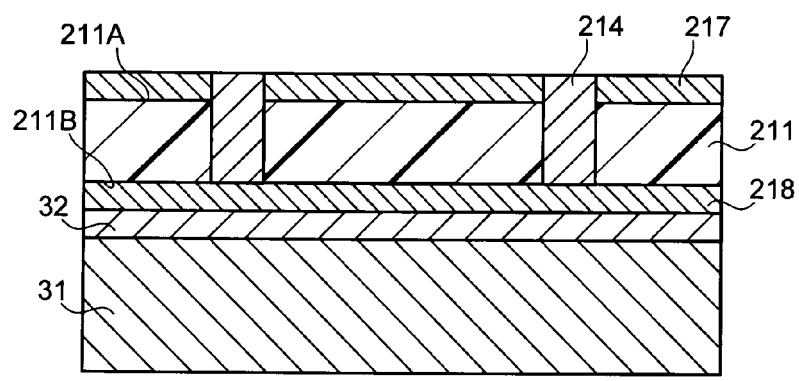
FIG. 7 is also a cross sectional view showing one step of the manufacturing method according to an embodiment of the present invention.
Figure 8:
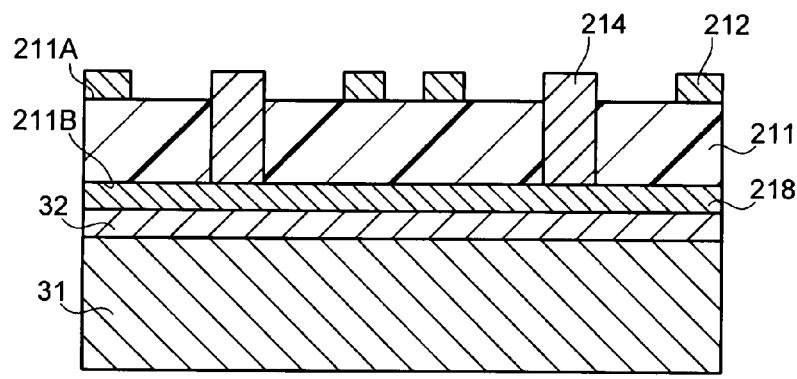
FIG. 8 is also a cross sectional view showing one step of the manufacturing method according to an embodiment of the present invention.

As shown in FIG. 7, then, via-fill plating is carried out for the through holes 211H so that the through holes 211H are embedded by metallic plating layers 214. As shown in FIG. 8, then, the first treatment is carried out for the first electrode layer 217 again so that the circular openings 212 are formed under the condition that the metallic plating layers 214 are disposed at the centers of the corresponding openings 212. As a result, the first electrode pattern 212 is formed and the second electrode pattern 213 made of the second electrode layer 218 and having the convex portions 214 made of the metallic plating layers 214 is formed.

Figure 9:
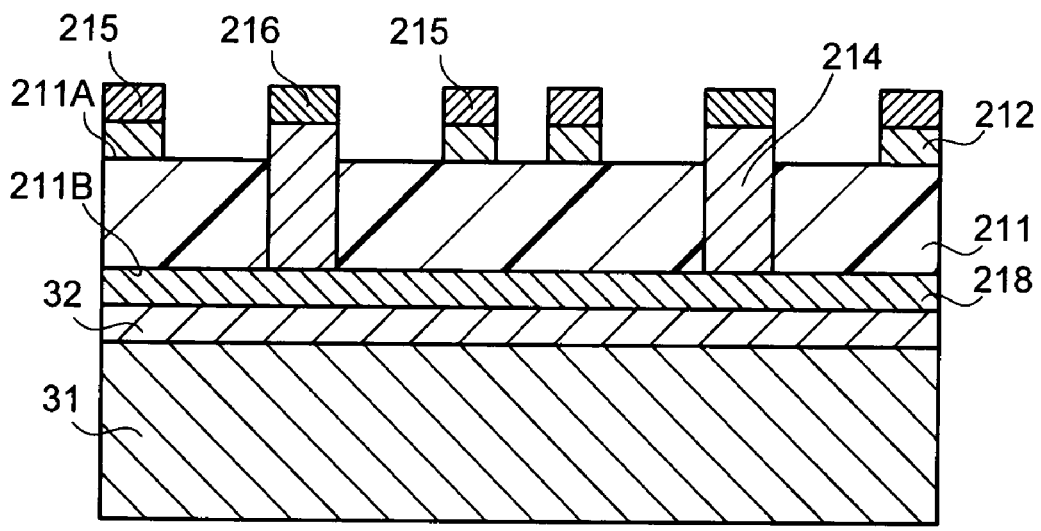
FIG. 9 is also a cross sectional view showing one step of the manufacturing method according to an embodiment of the present invention.
Figure 10:
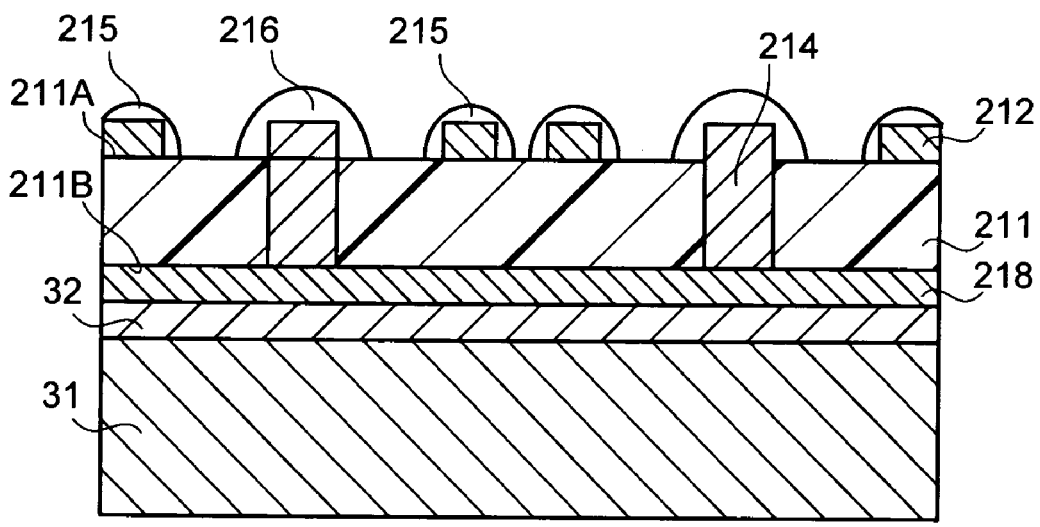
FIG. 10 is also a cross sectional view showing one step of the manufacturing method according to an embodiment of the present invention.

As shown in FIG. 9, then, the first solder material 215 is formed over the first electrode pattern 212 and the second solder material 216 is formed on the convex portions 214 of the second electrode pattern 213. As shown in FIG. 10, the first solder material 215 and the second solder material 216 are reflowed to be melted so that the first solder material 215 is formed at the edges of the first electrode pattern 212 in curved surface shape and the second solder material 216 is formed at the convex portions 214 in hemispherical surface shape, the curved surfaces at the edges of the first electrode pattern 212 being curved outward from the edges thereof and the hemispherical surfaces at the convex portions 214 being curved outward.

As shown in FIG. 9, in the formation of the first solder material 215 on the first electrode pattern 212 and the formation of the second solder material 216 on the convex portions 214 of the second electrode pattern 213, HAL treatment may be employed. The HAL treatment is conducted using a plating apparatus for plating a solder called as hot air leveler. In this case, the laminated body shown in FIG. 8 is immersed in a solder bath containing a heated and melted solder material so that the solder materials are formed on the first electrode pattern 212 and the convex portions 214.

Thereafter, when the laminated body is pulled up from the solder bath, a hot air is blown to the laminated body such that the blowing direction of the hot air is orthogonal to the surfaces in the sides of the first electrode pattern 212 and the convex portions 214. In this case, the surface of the solder layer formed on the first electrode pattern 212 and the like can be smoothed and uniform in thickness. As a result, as shown in FIG. 9, the first solder material 215 can be formed on the first electrode pattern 212 and the second solder material 216 can be formed on the convex portions 214.

In FIG. 10, the first solder material 215 and the second solder material 216 are reflowed to be melted so that the first solder material 215 is formed at the edges of the first electrode pattern 212 in curved surface shape and the second solder material 216 is formed at the convex portions 214 in hemispherical surface shape, the curved surfaces at the edges of the first electrode pattern 212 being curved outward from the edges thereof and the hemispherical surfaces at the convex portions 214 being curved outward, as described above. In this case, the reflow of the solder materials causes the prevention of the occurrence of whisker crystal by the heating accompanied by the reflow of the solder materials in addition to the formation of the outwardly curved surfaces of the solder materials.

Moreover, in the formation of the first solder material 215 on the first electrode pattern 212 and the formation of the second solder material 216 on the convex portions 214 of the second electrode pattern 213, electroless plating may be carried out instead of the use of HAL treatment. Concretely, the laminated body shown in FIG. 8 is immersed in an acidic tin plating bath, for example so that tin material is deposited as the solder materials on the first electrode pattern 212 and the convex portions 214 of the second electrode pattern 213. In this way, as shown in FIG. 9, the first solder material 215 may be formed on the first electrode pattern 212 and the second solder material 216 may be formed on the convex portions 214 of the second electrode pattern 213.

According to the manufacturing process as described above, the detecting panel 21 is formed. Then, the electrode plate 22 is provided so as to be opposite to the detecting panel 21 and the mixed gas is charged while the casing is conducted to form the intended radiation detector as shown in FIG. 1.

Although the present invention was described in detail with reference to the above examples, this invention is not limited to the above disclosure and every kind of variation and modification may be made without departing from the scope of the present invention.

For example, in those embodiments, the first solder material 215 is formed so as to have the curved surfaces at the edges of the first electrode pattern 212 and the second solder material 216 is formed so as to have the hemispherical surfaces at the convex portions 214 of the second electrode pattern 213. However, only if the above-described effect/function can be exhibited, the first solder material 215 may be formed so as to have any shaped surfaces at the edges of the first electrode pattern 212 and the second solder material 216 may be formed so as to have any shaped surfaces at the convex portions 214 of the second electrode pattern 213.

In those embodiments, the first solder material 215 and the second solder material 216 are prepared and formed on both of the first electrode pattern 212 and the convex portions 214, but one solder material is prepared and formed either of the first electrode pattern 212 and the convex portions 214. When the first solder material 215 is formed on the first electrode pattern 212, the primary arc discharge due to the edges of the first electrode pattern 212 can be prevented. When the second solder material 216 is formed on the convex portions 214 of the second electrode pattern 213, the secondary arc discharge due to the surface uniformity of the second electrode pattern 213 can be prevented.

In the present invention, the solder materials are employed such that the shapes of the edges of the first electrode pattern exposing to the corresponding openings are rendered in the respective curved surfaces and the shapes of the convex portions of the second electrode pattern are rendered in the respective curved surfaces (hemispherical surfaces) through the reflow of the solder materials. However, any material may be employed only if the material can have a melting point much lower than the material making the electrode and can be shaped so as to have a curved surface through the reflow thereof.

Namely, the solder materials are selected only because the solder materials are in existence and commercially available. Therefore, only if the above-described effect/function can be exhibited, another material may be employed which is available at present or in the future.

What is claimed is:

1. A method for manufacturing a radiation detector using gas amplification, comprising the steps of:

forming a first electrode layer on a first surface of an insulating member and forming a second electrode layer on a second surface of said insulating member opposite to said second surface thereof;

conducting a first treatment including resist coating, exposing, developing and etching for said first electrode layer to form a plurality of openings for processing at said first electrode layer;

irradiating an energy beam onto said insulating member via said plurality of openings for processing formed at said first electrode layer or conducting a second treatment including resist coating, exposing and developing when said insulating member is a photosensitive insulating member to form through holes at said insulating member in a thickness direction of said insulating member;

conducting via-fill plating into said through holes to form metallic plating layers so as to embed said through holes;

conducting said first treatment for said first electrode layer to form a plurality of circular openings such that said metallic plating members are disposed at centers of said circular openings, respectively, and to form a first electrode pattern while forming a second electrode pattern made of convex portions of said metallic plating layers and said second electrode layer; and forming and reflowing a first solder material on said first electrode pattern such that edges of said first electrode pattern exposing to said openings are shaped in respective continuous first curved surfaces by covering said edges thereof with said first solder material.

2. The manufacturing method as set forth in claim 1, further comprising the step of forming and reflowing a second solder material on said convex portions of said second electrode such that said convex portions of said second electrode pattern are shaped in respective continuous second curved surfaces by covering said convex portions with said second solder material.

3. The manufacturing method as set forth in claim 1, wherein each of said first curved surfaces is shaped so as to be curved outward from the corresponding one of said edges of said first electrode pattern.

4. The manufacturing method as set forth in claim 1, wherein each of said second curved surfaces is shaped in hemisphere so as to be curved outward.

5. A method for manufacturing a radiation detector using gas amplification, comprising the steps of:

forming a first electrode layer on a first surface of an insulating member and forming a second electrode layer on a second surface of said insulating member opposite to said second surface thereof;

conducting a first treatment including resist coating, exposing, developing and etching for said first electrode layer to form a plurality of openings for processing at said first electrode layer;

irradiating an energy beam onto said insulating member via said plurality of openings for processing formed at said first electrode layer or conducting a second treatment including resist coating, exposing and developing when said insulating member is a photosensitive insulating member to form through holes at said insulating member in a thickness direction of said insulating member;

conducting via-fill plating into said through holes to form metallic plating layers so as to embed said through holes;

conducting said first treatment for said first electrode layer to form a plurality of circular openings such that said metallic plating members are disposed at centers of said circular openings, respectively, and to form a first electrode pattern while forming a second electrode pattern made of convex portions of said metallic plating layers and said second electrode layer; and forming and reflowing a solder material on said convex portions of said second electrode pattern such that said convex portions are shaped in respective continuous curved surfaces by covering said convex portions with said solder material.

6. The manufacturing method as set forth in claim 5, wherein each of said curved surfaces is shaped in hemisphere so as to be curved outward.

* * * * *